May 1, 1923.
R. L. WILLIAMS
SELECTIVE RECEIVER
Filed Nov. 8, 1917
1,453,612
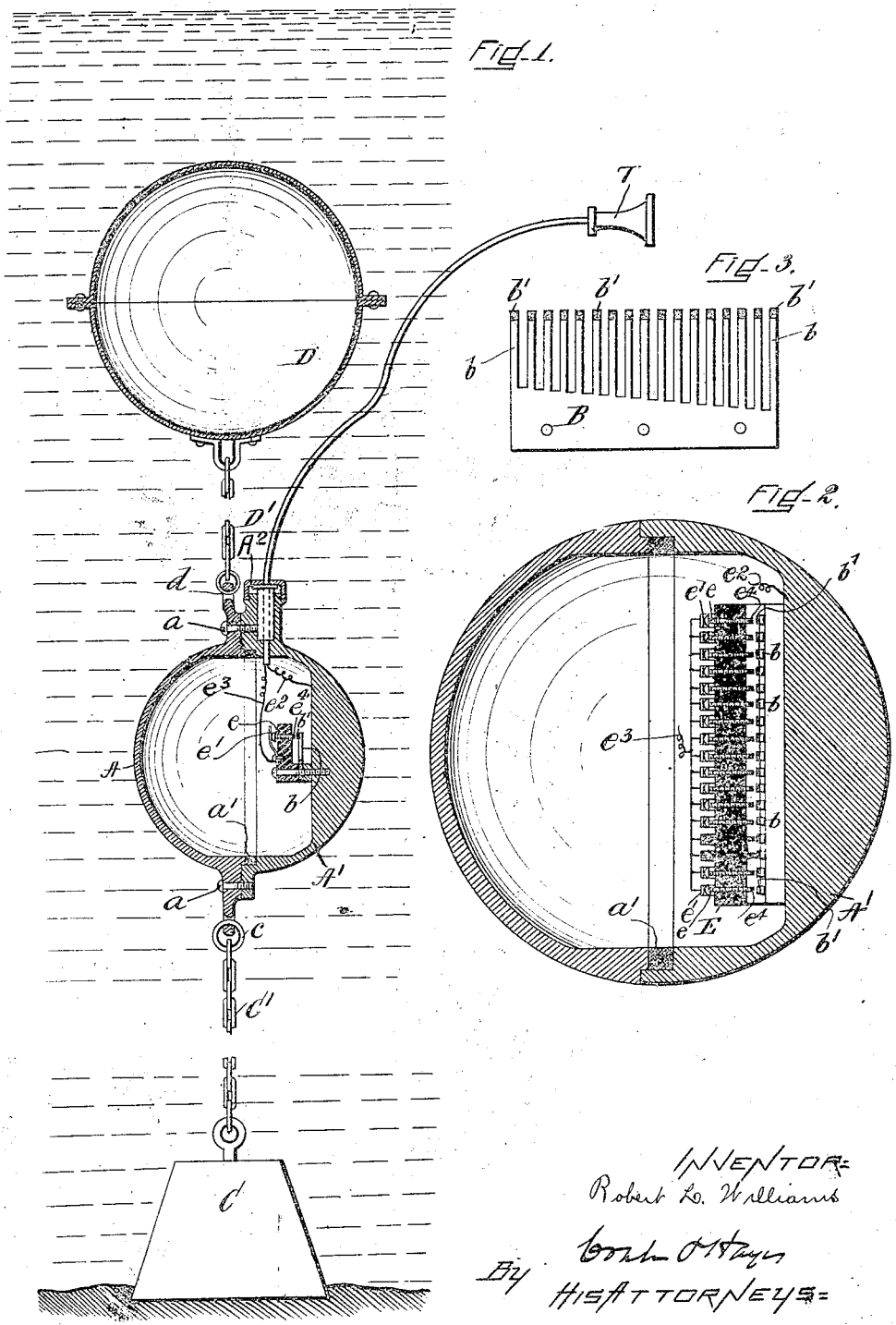

Patented May 1, 1923.

1,453,612

UNITED STATES PATENT OFFICE.

ROBERT L. WILLIAMS, OF NEWTON, MASSACHUSETTS, ASSIGNOR TO SUBMARINE SIGNAL COMPANY, OF PORTLAND, MAINE, A CORPORATION OF MAINE.

SELECTIVE RECEIVER.

Application filed November 8, 1917. Serial No. 200,888.

*To all whom it may concern:*

Be it known that I, ROBERT L. WILLIAMS, of Newton, in the county of Middlesex and State of Massachusetts, a citizen of the United States, have invented a new and useful Improvement in Selective Receivers, of which the following is a specification.

My invention relates to apparatus for receiving signals or sounds sent in the form of compressional or sound waves, and transforming them into corresponding electrical waves in a circuit containing an indicator, i. e., a telephone receiver, galvanometer, or the like. It relates particularly to means comprising a series of vibratory circuit closers each tuned to a different pitch from that of all the others whereby each will respond actively to close its circuit only to signals of a similar pitch to its own. By means of my invention, therefore, while signals may be received from a number of sources each separately tuned, for example, a number of ships each having a different periodicity, each signal will excite a reed tuned to its own frequency.

My invention also comprises the arrangement of such an apparatus in a watertight casing which may be suspended in the open water or in a tank on board ship and so be able to receive such signals with the least loss of efficiency.

My invention will be understood by reference to the drawings, in which it is shown in its preferred form, Fig. 1 being a vertical section of mechanism embodying my invention, Fig. 2 being an enlarged horizontal section therof, and Fig. 3 being a detail of the reed circuit closers.

The casing which encloses the mechanism especially embodying my invention comprises two members A, A¹, which are bolted together by bolts $a$, and provided with a gasket $a^1$ or other packing to make the joint watertight.

The member A carries eyes by one of which $c$, the casing is connected by the chain C¹ with the weight C and by the other $d$, the casing is connected with the submerged buoy D by the chain D¹.

Within the casing and electrically connected thereto is the metal plate B from which project a number of teeth reeds $b$, each of a different length from the others, or otherwise constructed whereby each will vibrate at a different frequency from all the others and each will vibrate upon the incoming of sound waves of its own frequency. Each reed has a carbon point $b^1$ which makes contact with a carbon terminal $e^1$ for screw $e$.

E is a plate of insulating material which is conveniently mounted on the part A¹ of the casing. In this plate E are mounted terminals $e$, preferably made or tipped with carbon, equal in number to the teeth $b$ on the plate B and each located opposite to one of said teeth and in such proximity thereto that the active vibration of such tooth such as might be caused by sound vibrations of its natural frequency will cause electrical contact between carbon point on such tooth and its opposing carbon terminal.

Each terminal $e$ is connected by a spring $e^1$ or otherwise with a circuit, individual or preferably as shown, comprising a wire $e^3$ which with the wire $e^2$ connected to the casing A¹ may form a cable $e^5$ protected by insulation and running through the water or otherwise to the indicators and battery at the observation station.

A² is a stuffing box through which the cable passes, this being necessary to keep the interior of the casing free from water.

The character of such observation station and the indicating instruments are so well known as not to need further explanation or illustration. Such an instrument is shown at T in Fig. 1.

I prefer to use carbon contacts but the contacts may be made of other material effective for that purpose. In this and in other ways the details of my invention may be changed without, however, departing from its spirit.

What I claim as my invention is:

1. A device for receiving submarine signals comprising a watertight casing and means for anchoring it below the surface of the water, said casing having mounted within it a series of reeds of different lengths, forming electric terminals, and a series of contacts one for each reed located to be engaged by its reed when in vibration, and an indicator electrically connected with all of said reeds and said contacts whereby vibration set up in any of said reeds will close the circuit at the appropriate contacts and be indicated at the indicator.

2. A device for receiving submarine signals comprising a water-tight casing, means for anchoring said casing below the surface of the water, a buoy for sustaining said casing above its anchoring means, a series of reeds of different lengths, forming electric terminals, within said casing, a plate of insulating material mounted adjacent said reeds, within said casing, a series of contacts mounted on said insulating plate and each so located as to be engaged by a reed when such reed is in vibration, and an indicator electrically connected with all of said reeds and said contacts; whereby vibration set up in any one of said reeds will close the circuit at a contact corresponding to a frequency to which its reed is responsive, and such result be denoted by said indicator.

3. A device for receiving submarine signals comprising a water-tight casing, means for anchoring said casing below the surface of the water, a buoy for sustaining said casing above its anchoring means, a series of reeds of different lengths, forming electric terminals, within said casing, a plate of insulating material mounted adjacent said reeds, within said casing, a series of adjustable contacts mounted on said insulating plate and each so located as to be engaged by a reed when such reed is in vibration, and an indicator electrically connected with all of said reeds and said contacts; whereby vibration set up in any one of said reeds will close the circuit at a contact corresponding to a frequency to which its reed is responsive, and such result be denoted by said indicator.

4. A device for receiving submarine signals comprising a water-tight casing, means for anchoring said casing below the surface of the water, a buoy for sustaining said casing above its anchoring means, a series of reeds of different lengths, forming electric terminals, within said casing, said reeds being tipped with carbon, a plate of insulating material mounted adjacent said reeds, within said casing, a series of contacts, also tipped with carbon, mounted on said insulating plate and each so located as to be engaged by a reed when such reed is in vibration, and an indicator electrically connected with all of said reeds and said contacts; whereby vibration set up in any one of said reeds will close the circuit at a contact corresponding to a frequency to which its reed is responsive, and such result be denoted by said indicator.

ROBERT L. WILLIAMS.